United States Patent Office 3,623,369
Patented Nov. 30, 1971

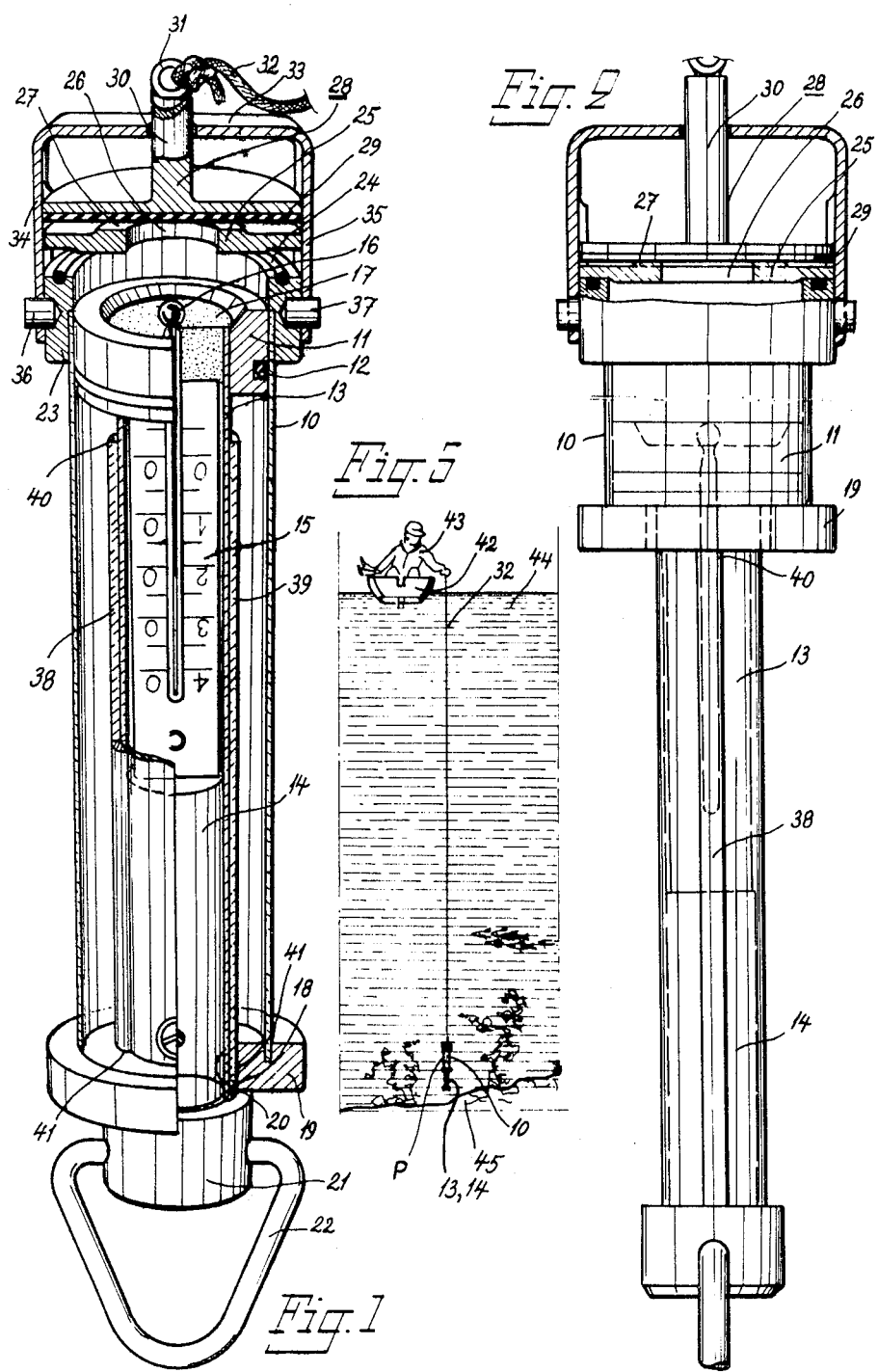

3,623,369
WATER-SAMPLING DEVICE
Ragnar E. Kjellberg, Kroksta, Sweden, assignor to
Johan Eric Johansson, Storvik, Sweden
Filed Aug. 27, 1969, Ser. No. 853,394
Claims priority, application Sweden, Sept. 2, 1968,
11,780/68
Int. Cl. G01k 13/12; G01n 1/10
U.S. Cl. 73—354       5 Claims

ABSTRACT OF THE DISCLOSURE

A water sampling device, including a vessel capable of being closed and opened by means of a remote controlled valve and adapted to be lowered into lakes, rivers etc. for the purpose of collecting samples of water. The device includes a vessel capable of being opened and closed by a remote controlled valve means, a thermometer for measuring the temperature of the water, and a line for lowering the vessel down to the desired depth. It has a single actuating pump, the piston of which can be retained in the position taken after an evacuation stroke. A closing valve cooperates with the evacuation chamber, and the movable valve means has an attachment for the line which can be opened by pulling said line.

---

The present invention relates to a sampling device adapted to be lowered into lakes, rivers etc. for the purpose of collecting samples of water, which can then be examined with regard to their oxygen content and content of other substances suspended or dissolved therein. The device is of the type which includes a vessel capable of being opened and closed by a remote controlled valve means and adapted to collect said sample of water, a thermometer for measuring the temperature of the water, and a line for lowering the vessel down to the desired depth.

It is to great advantage in many instances if knowledge can be gained with respect to certain properties of the water located at different depths in lakes, rivers etc. This is particularly true with respect to the fishing industry and the angler or amateur fisherman. One important factor associated with the presence or absence of fish in unproven waters is the oxygen content of the water or the possible content of other substances suspended or dissolved therein, as well as the temperature of the water. It has been shown that fish instinctively avoid areas of water low in oxygen, and consequently to fish in these areas is a complete waste of time.

The object of the invention is to enable a rapid and correct assessment of the water, particularly with regard to its oxygen content at the desired depth. The sampling device includes a single acting evacuation piston type pump. The piston of the pump can be retained in the position it takes subsequent to completing its evacuation stroke, and by a closing or shut-off valve cooperating with the evacuation chamber the movable valve means which forms the attachment point for the line, is capable of being opened by jerking said line at the position from which the device is lowered into the water.

In accordance with a preferred embodiment of the invention the sampling device comprises a preferably transparent tube forming the pump cylinder. At each end is a cap member, one cap member is passed through by the piston rod of the piston and the other cap member is provided with a valve aperture, suitably surrounded by a valve seating. The valve aperture is capable of being closed by means of the movable valve member, which in turn is retained positionwise by the sampling device in general and restricted in movement in relation thereto.

In accordance with a further development of the invention, at least one rod or like member is securely connected to the piston rod and arranged substantially parallel therewith. A bore is arranged in the corresponding cap member, and the length of the rod is so adapted that the end thereof which passes through the opening in the cap member and projects beyond the bore when the piston has completed its evacuation stroke. The piston rod is rotatable about its axis to at least such an extent that said end of the rod, subsequent to being rotated out of the zone of the bore bears against the unbroken surface of the cap member, thereby retaining the piston in its aforementioned position.

In another embodiment of the invention, at least part of the piston rod is in the form of a transparent tube, in which is inserted a thermometer.

The piston rod may also be provided at its outer end with a handle for maneuvering the same, and optionally with a suspending device for sink weights.

The invention will now be described in more detail with reference to an embodiment thereof shown diagrammatically in the accompanying drawing, further characterizing features of the invention being disclosed in conjunction therewith, in the drawing:

FIG. 1 is a perspective view, partly in longitudinal section, of a sampling device according to the invention, the elements being in the position used prior to the sampling device being placed in order for sampling;

FIG. 2 is a side view of the sampling device illustrated in FIG. 1, but with the elements being placed in order for taking a sample, and FIG. 3 illustrates the method in which the sampling device of the invention is used.

FIG. 1 shows a suitably transparent tube of cylindrical cross section and made for example, of a plastic material. The tube is intended to serve as a pump cylinder, in which a piston 11 provided with a suitable ring seal 12 is mounted for axial movement. Secured to the piston 11 is a piston rod 13, which is suitably in the form of a tube, at least at its upper portion as seen in the figure. The lower end of the piston rod may be completely solid, as shown at 14. As shown in FIG. 1, a thermometer, generally designated 15, is inserted in the upper, tubular portion of the piston rod, the bulb 16 of said thermometer extending through the piston, up into a recess 17 into the upper surface of said piston 11. A seal is suitably maintained between the piston 11 and the protruding portion of the thermometer.

The lower portion of the piston cylinder 10 is sealingly inserted into an annular groove 18 in a terminating cap 19, through a central opening 20 in which the piston rod 14 is free to slide. The piston rod is terminated beneath the cap 19 with a robust head member 21, which forms an attachment means for a stirrup member 22, which may serve as a handle for extracting the piston, and optionally as an attachment means for sink weights (not shown).

The upper portion of the cylinder tube 10 is terminated with a cap member, taking the form of a ring flange 23, which sealingly encircles the mouth of the cylinder. The flange is suitably provided with an annular seal 24 comprising, for example, an elastically resilient material or the like, and is inserted in a groove located in the upper surface of said flange. The seal 24 is adapted to seal against a cap or a ring 25 capable of being pressed thereagainst, and which in FIG. 1 is shown in an unassembled position to expose the construction of the device to the viewer. The cap 25 presents in the center thereof a throughpassage opening 26, which is surrounded by a raised, annular seating 27 which cooperates with an axially movable valve means 28. The bottom of the valve means 28 is preferably coated with a suitable sealing material, such as rubber, plastic or the like. The valve member presents a stem 30, provided with an upper ring 31 to which a lowering line 32 is secured. The pin 30 slidably passes through the web 33 of a stirrup member, the legs 34 and 35 of which are pivotally mounted by studs 36, 37 or the like to the ring flange 23, so that when the valve member 28 is drawn up to its highest position, resting against said web 33, the stirrup member and the valve member can be moved away to expose the opening 26 to the cylinder chamber in the tube 10.

As will also be seen from FIG. 1, longitudinally extending cams, ribs or like members 38 and 39 extend along the piston rod 13, 14, approximately along diametrically opposed generatrices. The cams or ribs, which extend at a position 40 immediately beneath the piston 11, pass through bores 41 disposed in the lower end cap member 19 and adapted to accommodate said cams.

FIG. 2 shows the same sampling device at that illustrated in FIG. 1 but with the piston rod 13, 14 withdrawn from the cylinder 10 so that the piston 11 is located in its lower end position, i.e. in the position taken subsequent to an evacuation stroke. During the stroke the valve member 28 with its plate and seal 29 is urged against the seating 27 on the ring or cover member 25 by the ambient atmospheric pressure, whereby the hole 26 is thus completely closed disconnecting communication therethrough with the interior of the cylinder 10, which consequently is practically void of air.

To enable the piston and piston rod to be locked in the position shown in FIG. 2 subsequent to withdrawing the piston rod, the aforedescribed cams or ribs 38 and 39 are rotated through a certain angle, e.g. a quarter turn about the axis of the piston rod, whereby the upper portions or crests of the cams, indicated by reference numeral 40, rest against the undersurface of the end cover member 19 remote from the holes through which the cams can be passed into the cylinder 10. Thus, the piston and piston rod are locked in the withdrawn position, while a vacuum prevails in the cylinder 10 above the piston 11.

The manner in which the sampling device of the invention is used is graphically illustrated in FIG. 3. The figure shows a row boat 42 and an oarsman 43. As shown in the figure, the oarsman has lowered the sampling device, here indicated by the reference numeral P, substantially to the bottom 45 of the river or lake, by means of the line 32, subsequent to having first, as indicated in the figure, withdrawn the piston rod 13, 14 from the cylinder 10 and locked the same, the valve member 28 being located in the sealing position in relation to the valve seating 27, as shown in FIG. 2. The sampling device is thus suspended from the line 32 via the stem 30 of the valve member 28, which as a result of the pressure difference caused by the partial vacuum in the cylinder 10 is urged against the upper surface of the ring 25. The vacuum is still maintained in the position of the sampling device shown in FIG. 3. To enable a sample of water to be taken at the shown depth, it is now only necessary to pull the line 32, thereby releasing the valve member from the seating 27. The water is then free to flow through the hole 26 in the cylinder 10, which is rapidly filled with water from the level where the sampling device is located. Because the web 33 of the stirrup member locks the valve member to the sampling device in general, the device, subsequent to being filled with water, can be pulled carefully up to the surface of the water, by means of the line 32, whereafter the stirrup member and the valve member can be moved aside, to expose the opening 26, either to permit the quantity of water collected in the cylinder 10 to be emptied in a test vessel or to permit chemical reagents to be introduced therein, by means of which, for example by noting a change in colour of the water, the oxygen content of the water at the depth to which the device was lowered can be determined. Further, the temperature of the water at said depth can be read from the thermometer 15, visible through the transparent wall of the piston rod.

The sampling device of the invention is extremely simple to operate, since it is only necessary to withdraw the piston from the piston rod and rotate same through a slight angle to the aforementioned locking position, in which relative position of the elements the sampling device is immediately ready to be lowered to the desired depth of water, for the purpose of collecting water in the manner described with reference to FIG. 3.

The invention is not restricted to the shown and described embodiment but can be varied within the scope of the following claims.

What is claimed is:

1. A water sampling device comprising in combination a cylinder having a water inlet located at one end thereof; a piston having a piston rod and movable in the cylinder away from and toward said water inlet; means for latching the piston in a position remote from the water inlet; a line for lowering and lifting the device into and out of the water; a combined line attachment and water inlet closure unit which is movable, by jerking said line from a water inlet sealing position in which said unit is held in abutment with a seating surface surrounding said water inlet by virtue of the vacuum created in the cylinder upon moving the piston to its position remote from said water inlet, into engagement with an abutment surface spaced from said water inlet sealing position, thereby opening said water inlet.

2. The device of claim 1 including a preferably transparent tube forming the cylinder, the tube being provided at the ends thereof with end cap members, one end cap member being passed through by the piston rod of the piston and the other end cap member carrying said water inlet and closure unit.

3. The device of claim 2 in which a rib is associated with the piston rod and arranged substantially parallel therewith, and a bore is arranged in the corresponding end cap member for said rib, the length of the rib being such that the end thereof which passes through said bore is located outside said bore when the piston has been moved to complete its evacuation stroke, the piston rod being rotatable about its axis, so that after being rotated away from the zone of said bore, abuts the surface of the cap member, thereby locking the piston in its evacuated position.

4. The device of claim 2 in which the piston rod at least partially comprises a transparent tube, in which a thermometer is inserted.

5. A device of claim 2 in which the outer end of the piston rod presents a handle for maneuvering the same from which sink weights can be suspended.

References Cited
UNITED STATES PATENTS

| | | | |
|---|---|---|---|
| 1,392,279 | 10/1921 | Gersdorff | 73—425.4 |
| 3,273,394 | 9/1966 | Chaney | 73—425.4 |
| 3,365,953 | 1/1968 | Gold | 73—425.6 |
| 3,367,191 | 2/1968 | Richard | 73—425.6 |

LOUIS R. PRINCE, Primary Examiner

D. E. CORR, Assistant Examiner

U.S. Cl. X.R.

73—425.6